United States Patent [19]

Guibert

[11] 4,157,650
[45] Jun. 12, 1979

[54] CRYOGENIC RAPID FOOD COOLING MACHINE

[76] Inventor: Raul Guibert, 8343 W. 4th St., Los Angeles, Calif. 90048

[21] Appl. No.: 839,386

[22] Filed: Oct. 4, 1977

Related U.S. Application Data

[63] Continuation-in-part of Ser. No. 825,037, Aug. 16, 1977.

[51] Int. Cl.² ............................................. F25D 17/02
[52] U.S. Cl. ........................................ 62/374; 62/380; 426/524
[58] Field of Search ................ 62/60, 63, 64, 373, 62/374, 380, 382; 426/524

[56] References Cited

U.S. PATENT DOCUMENTS

| | | | |
|---|---|---|---|
| 2,153,742 | 4/1939 | Conn | 62/63 |
| 2,196,080 | 4/1940 | Reynoldson | 62/60 |
| 2,774,320 | 12/1956 | Kasser | 62/60 |
| 3,238,736 | 3/1966 | Macintosh | 62/374 |
| 3,255,608 | 6/1966 | Macintosh | 62/374 |
| 3,427,820 | 2/1969 | Hart | 62/374 |
| 3,688,518 | 9/1972 | Goltsos | 62/380 |

*Primary Examiner*—Ronald C. Capossela
*Attorney, Agent, or Firm*—Michael Ebert

[57] ABSTRACT

A cryogenic rapid-cooling machine for reducing the temperature of cartridges each formed by a vertical stack of sealed trays containing pre-cooked meals, the trays being nested in an open carton whose walls have holes to admit gas. The machine is constituted by an open-ended tunnel having a conveyor therein to continuously advance two parallel trains of cartridges from the inlet to the outlet. The space between the trains is bordered by the carton walls to define a center aisle, while the spaces between the opposing sides of the tunnel and the open sides of the cartons define outer aisles. Disposed in these aisles are a series of partition assemblies that divide the tunnel into consecutive treatment stages. Nozzles disposed in a main cooling stage adjacent the outlet stage serve to spray the cartridges passing therethrough with a cryogenic liquid. Fans act to draw the resultant cold gas from the main cooling stage through a succession of pre-cooling stages between the main cooling stage and the inlet stage. The cold gas, after threading its way through the cartridges in the pre-cooling stages in heat exchange relationship with the trays, is discharged from the first pre-cooling stage and a portion of the exhausted gas is recirculated in the inlet and outlet stages through the cartridges passing therethrough to create gas curtains serving to isolate the interior of the tunnel from ambient air.

11 Claims, 12 Drawing Figures

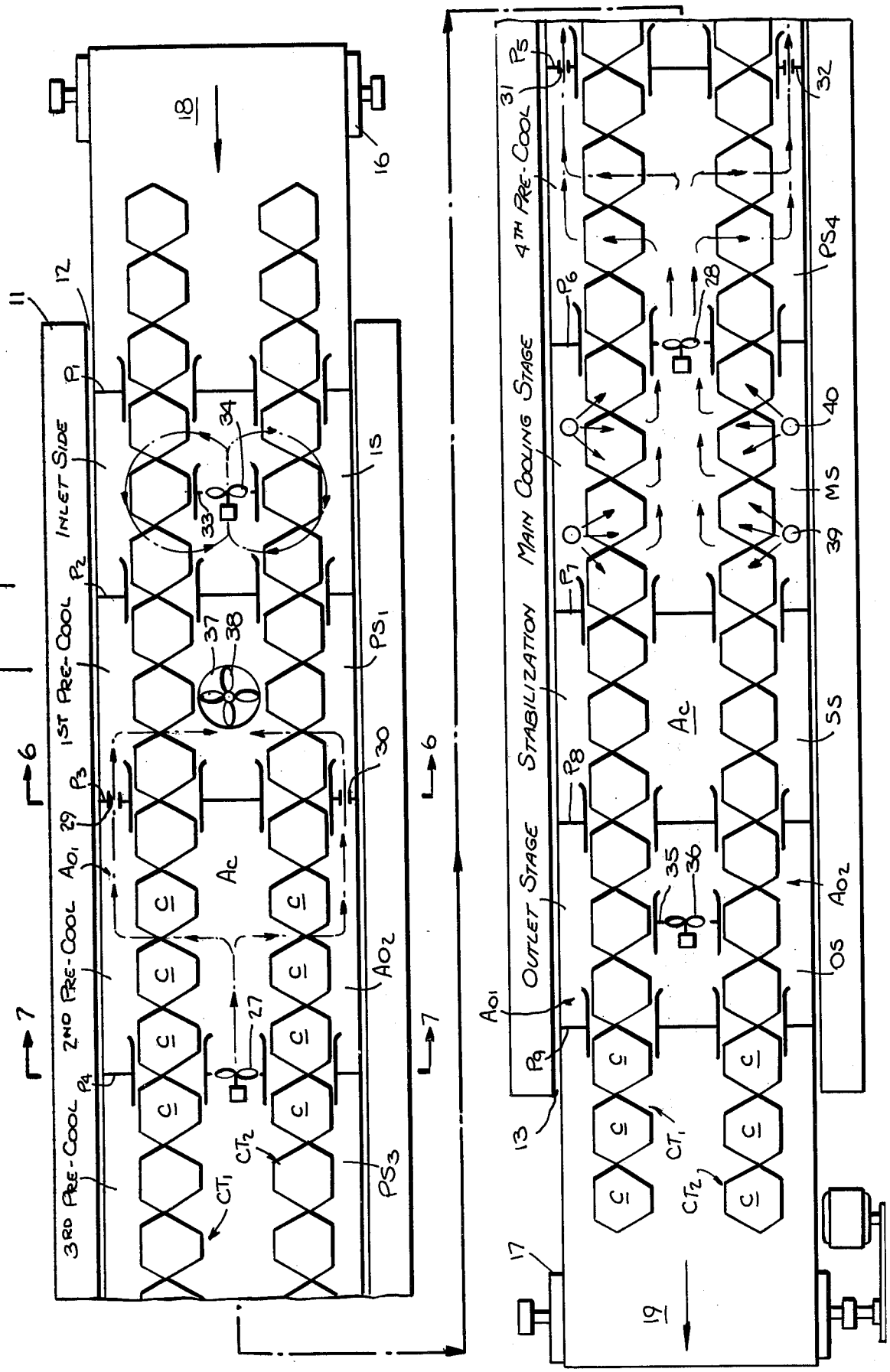

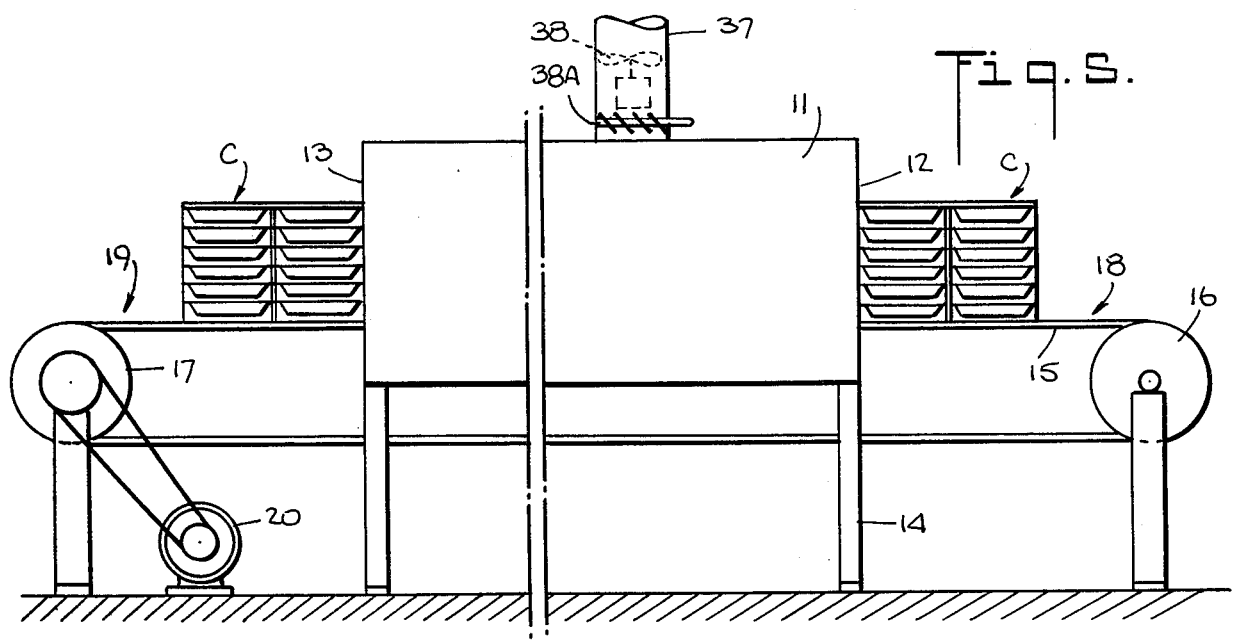
Fig. 5.
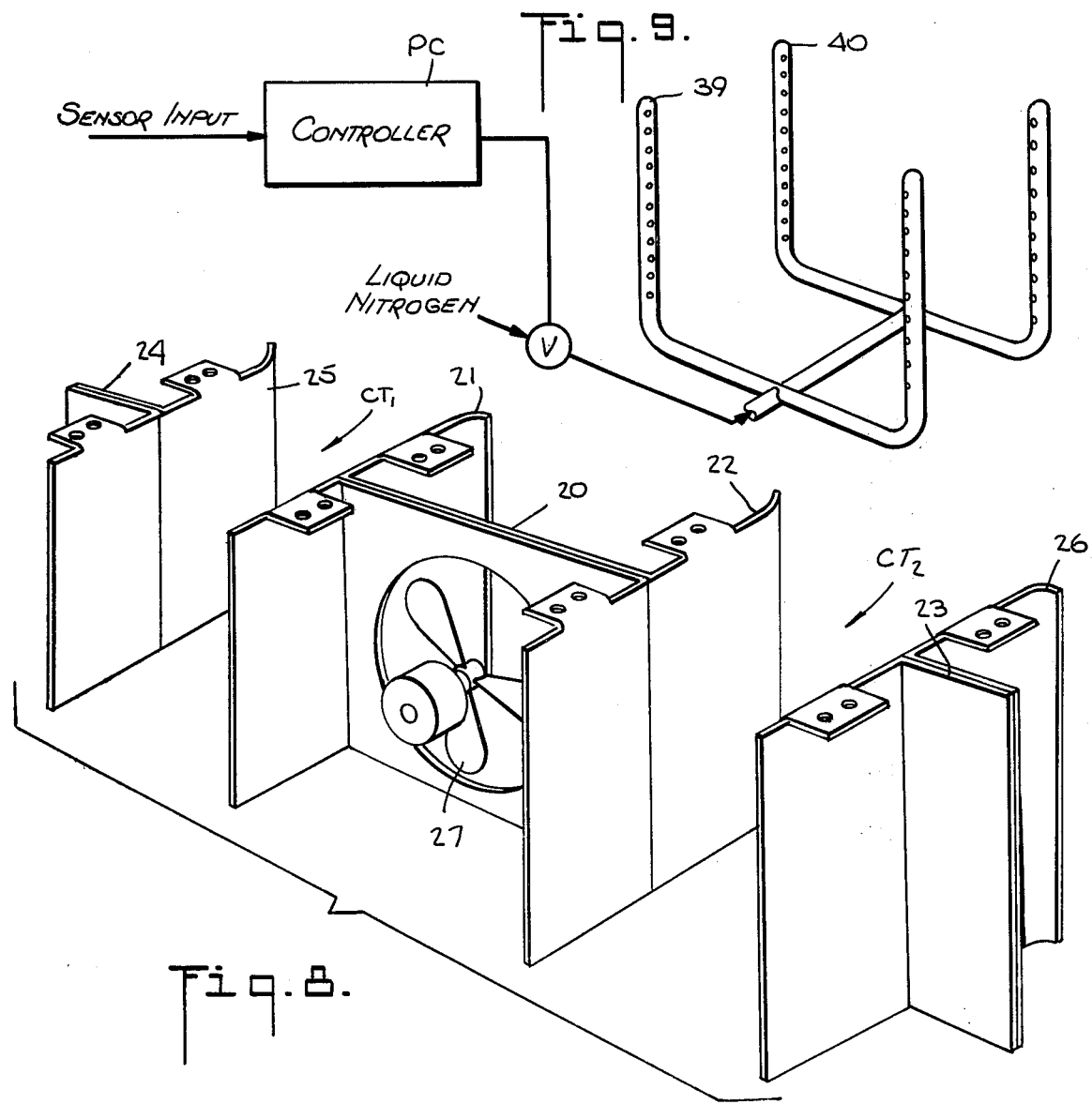
Fig. 9.
Fig. 8.

4,157,650

CRYOGENIC RAPID FOOD COOLING MACHINE

RELATED APPLICATION

This application is a continuation-in-part of my application Ser. No. 825,037, filed Aug. 16, 1977, entitled "Cartridge for Hot Air Oven."

BACKGROUND OF INVENTION

This invention relates generally to cryogenic cooling machines, and more particularly to a machine adapted to operate with cartridges containing pre-cooked meals to effect rapid cooling thereof.

My above-identified co-pending application discloses a fast food technique and apparatus therefor in which pre-cooked meals which have been kept under refrigeration are thereafter reheated in a hot air oven and made directly available to customers. The nature of the cooking, refrigeration and reheating operations are such that the essential texture, flavor and nutritional value of the food are maintained without significant degradation.

In this fast food technique, each cooked meal is placed in an individual tray and sealed, a stack of such trays being nested within an open carton to form a cartridge which facilitates subsequent handling and processing. The side walls of the carton are provided with holes to admit a heated or refrigerated gas which is circulated in the spaces between the trays in the stack to heat or cool the meals therein, as the case may be.

These cartridges, prior to being placed in an oven for reheating the pre-cooked meals, must be kept in a refrigerated storage chamber to maintain the food temperature just above the freezing point for as long as is necessary. In practice, this temperature may be in the range of about 20° to 30° F.; for when the moisture content of the food is rich in dissolved salts, the freezing point may be well below 32° F. It is vital that the food not be refrigerated below the freezing point, for the formation of ice crystals in the food is destructive of food texture and must be avoided. Also, it is important that the trays be sealed to prevent the loss of moisture and volatile constituents.

In the large scale production of cooked meals in connection with a fast food technique of the type disclosed in my copending application, after the meals have been cooked and placed in sealed trays, it is essential that the temperature of the hot meals in the trays be reduced in temperature quickly to a level approaching the cold temperature of the refrigerated chamber in which the trays are to be stored; for one cannot, as a practical matter, abruptly load the storage chamber with a large quantity of hot food. To this end, a blast tunnel may be used, but this is relatively inefficient and costly to operate.

In a prior attempt to accelerate the action of a conventional mechanical refrigeration system and to overcome certain shortcomings thereof, the Overbye U.S. Pat. No. 3,115,756 discloses an arrangement in which the food to be cooled or frozen is conveyed through an open tunnel on a foraminous belt below which are disposed the evaporation coils of a mechanical refrigeration system. Air is blown upwardly through the coils, and the resultant cold air is then forced through the belt to effect rapid cooling of the food advancing through the tunnel.

While the Overbye arrangement is more efficient than most blast tunnel freezers, it has serious drawbacks, among which is the formation of snow and ice on the refrigeration coils and other components of the system as a result of moisture extracted from the food being processed and from the ambient air. The formation of such snow and ice markedly reduces the thermal efficiency of the refrigeration system.

Another prior approach to rapid cooling is by means of cryogenic liquids such as liquid carbon dioxide, liquid nitrogen or liquid air having normal boiling points well below −100° F. Thus in the patents to Macintosh, U.S. Pat. Nos. 3,238,138 and 3,255,608, there are disclosed cryogenic refrigeration machines in which food is conveyed on a belt through an open-ended tunnel in which the food is sprayed with ultra-cold liquid nitrogen whose temperature is −320° F. to effect quick freezing thereof.

In the improved cryogenic freezing machine disclosed in the Hart U.S. Pat. No. 3,427,820, the food is conveyed through an elongated open-ended tunnel toward a freezing zone where the food is exposed to atomized liquid nitrogen. Pre-cooling of the food is effected by cold gas evolved in the freezing zone, the cold gas being sucked into a pre-cooling zone in advance of the freezing zone. In the Hart machine, rapid freezing is effected by the combined action of the latent heat of vaporization of the liquid nitrogen and the specific heat of the cold gas derived from the liquid. The heat energy necessary to transform the state of the liquid nitrogen into gas in the freezing zone is taken from the food exposed to atomized liquid nitrogen in this zone, whereas in the pre-freezing zone, the heat energy, or BTUs, which raises the temperature in the cold gas is absorbed from the advancing food which travels in heat exchange relationship with the cold gas.

In cryogenic freezing machines of the Hart and Macintosh type, the ends of the tunnel are open. No use is made of gas locks, for such locks complicate and slow down the conveyance of the food through the tunnel. Hence to minimize the entry of warm ambient air into the tunnel, the inlet and outlet is made as small as possible, consistent with the dimensions of the food to be processed in the machine. Also, in such prior machines, the food to be frozen cannot be sealed, for the food must be directly exposed to the liquid nitrogen.

These prior machines are therefore inappropriate to the fast food technique which is the concern of the present invention; for in this technique the pre-cooked meals must be sealed in trays to avoid the loss of moisture and volatile constituents, and freezing of the food as would occur with direct contact with liquid nitrogen must be avoided--for the desideratum in this technique is food cooled to a point just above freezing.

SUMMARY OF INVENTION

In view of the foregoing, it is the main object of this invention to provide a cryogenic machine adapted to operate with cartridges whose sealed trays contain cooked meals, the meals being rapidly cooled in the course of the passage of the cartridges through the machine.

More particularly, it is an object of this invention to provide a cryogenic machine which operates efficiently and reliably and wherein the food-loaded cartridges are conveyed through a succession of pre-cooling stages before entering a main-cooling stage where the cartridges are subjected to a cryogenic liquid, the cold gas evolved in the main cooling stage being drawn into and circulated through the pre-cooling stages in a circuitous path whereby full use is made of the cryogenic agent supplied to the machine before it is discharged. Thus the gas exhausted from the machine is relatively warm, and little of the available energy is wasted.

Also an object of this invention is to provide a cryogenic machine whose open-ended tunnel is effectively isolated from ambient air without the need for air locks or other mechanical expedients.

Yet another object of this invention is to provide a cryogenic machine in which the circuitous path of cold gas through the successive pre-cooling stages of the machine in the course of which the gas is intercepted by the cartridges passing through these stages renders the gas flow turbulent to promote rapid cooling of the food.

Briefly stated, these objects are attained in a cryogenic machine in accordance with the invention in which food-loaded cartridges whose sealed trays are nested in open cartons are conveyed through an open-ended tunnel, the cartridges advancing continuously from the inlet to the outlet of the tunnel in two parallel trains. The space between these trains defines a center aisle which is bordered by the walls of the cartons which have openings therein, whereas the spaces between the opposing sides of the tunnel and the open sides of the cartons in the trains define outer aisles.

Disposed in the aisles of the tunnel are partition assemblies dividing the tunnel into consecutive treatment stages. Nozzles erected in a main cooling stage adjacent the outlet stage serves to spray the cartridges passing therethrough with a cryogenic liquid. The cold gas evolved in the main stage flows through the carton holes into the center aisle and is drawn therefrom by fans through a succession of precooling stages between the main cooling stage and the inlet stage. The arrangement is such that in each pre-cooling stage, the gas is drawn through the cartridge in that stage between the center and the outer aisles thereof, whereby the gas flow is in a circuitous path. After threading its way through the cartridges in the pre-cooling stages in heat exchange relationship with the meals, the cold gas is exhausted from the first pre-cooling stage and a portion thereof is recirculated through the cartridges in the inlet and outlet stages to create gas curtains serving to isolate the interior of the tunnel from ambient air.

BRIEF OUTLINE OF DRAWINGS

For a better understanding of the invention as well as other objects and further features thereof, reference is made to the following detailed description to be read in conjunction with the accompanying drawings, wherein.

Figure 6:
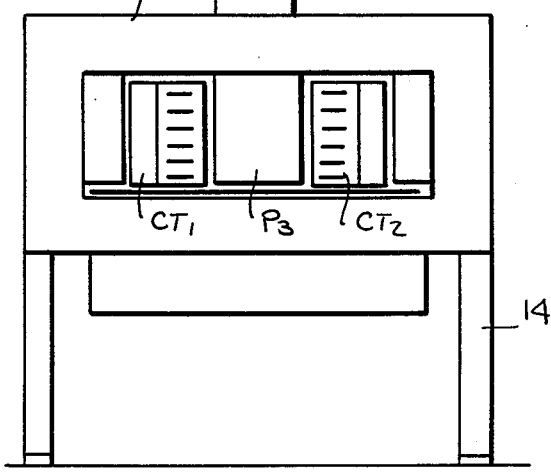
Figure 7:
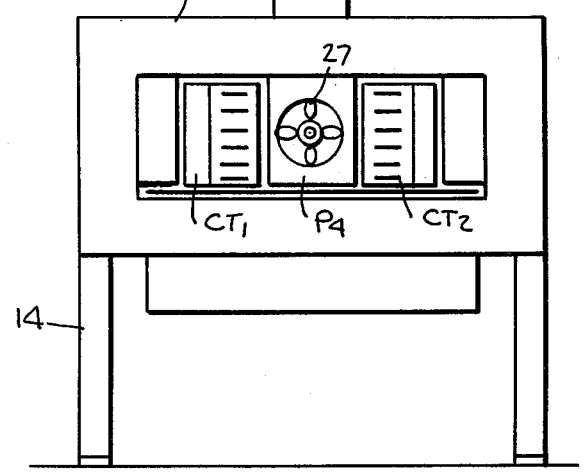
Figure 11:
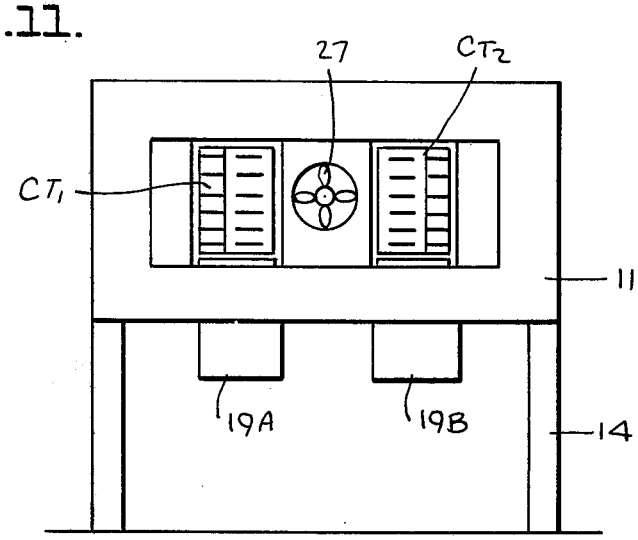
Figure 10:
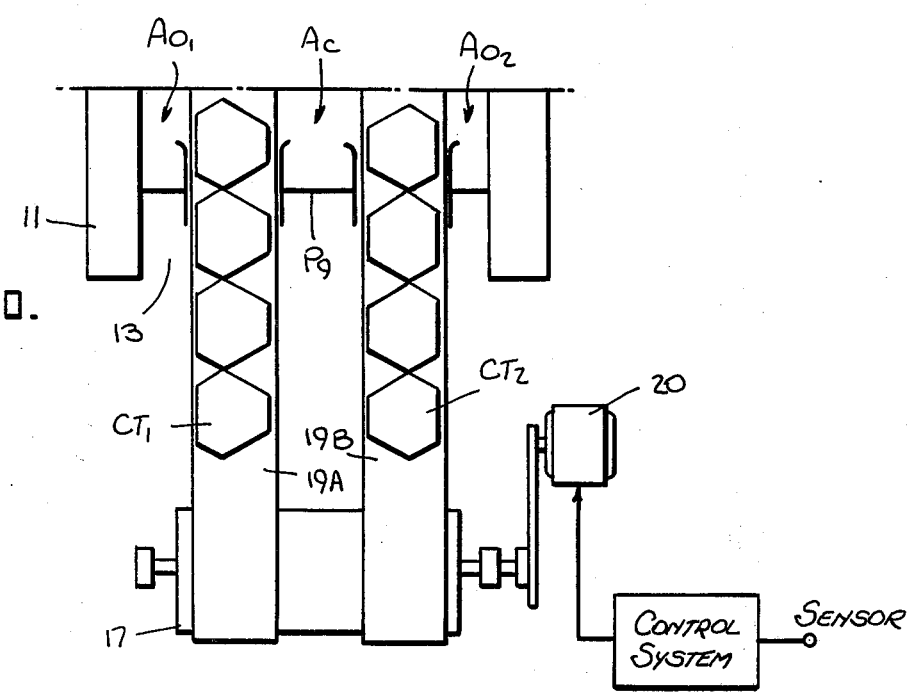

FIG. 4 schematically shows in plan view a preferred embodiment of a cryogenic cooling machine in accordance with the invention;

FIG. 5 is a side elevation of the machine;

FIG. 6 is a transverse section taken in the plane indicated by lines 6—6 in FIG. 4;

FIG. 7 is a transverse section taken in the plane indicated by lines 7—7 in FIG. 4;

FIG. 8 is a perspective view of one of the partition assemblies;

FIG. 9 is a perspective view of one of the nozzle manifolds in the main cooling stage;

FIG. 10 is a plan view of the output portion of a second embodiment of the cryogenic cooling machine in accordance with the invention;

FIG. 11 is a side elevation of the machine shown in FIG. 10; and

Figure 12:
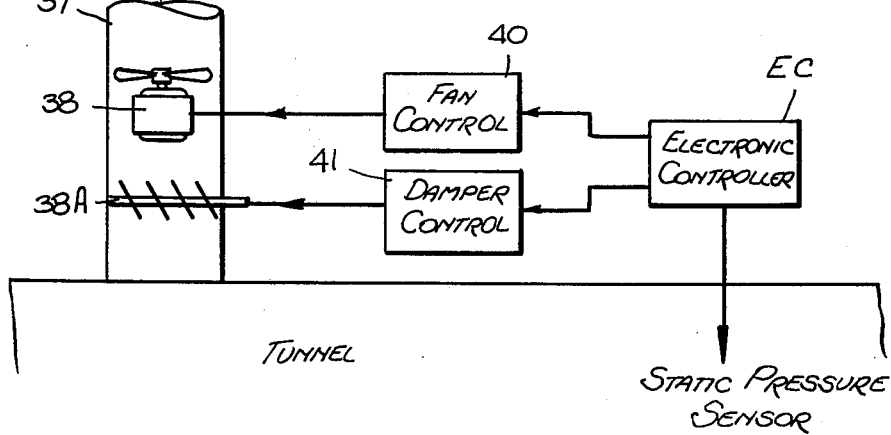

FIG. 12 schematically shows a static pressure control system associated with the machine.

DESCRIPTION OF INVENTION

The Cartridge

Figure 1:
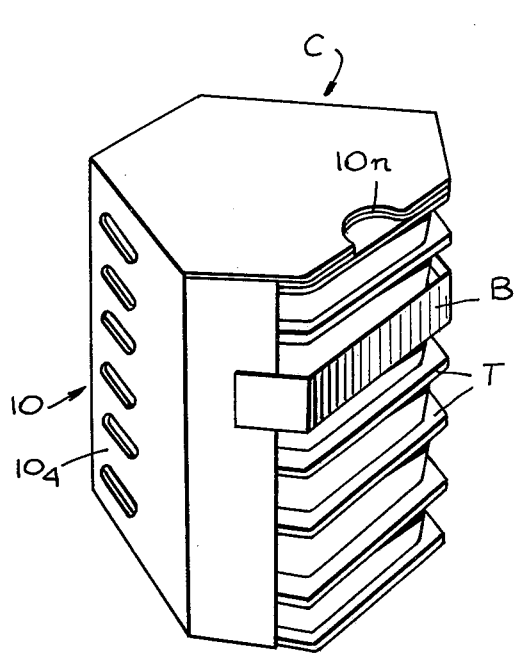
FIG. 1 is a perspective view of a cartridge usable in conjunction with a cryogenic machine in accordance with the invention, the cartridge being constituted by a stack of sealed trays nested within a carton, the trays containing pre-cooked meals.

Referring now to FIG. 1 showing a cartridge C for use in a cryogenic food-cooling machine in accordance with the invention, it will be seen that the cartridge is constituted by a vertical stack of like trays T nested within a carton 10. Trays 10 contain pre-cooked meals which are to be lowered in temperature by the machine and thereafter stored in a cold chamber until such time as the pre-cooked meals are to be reheated for service.

Figure 2:
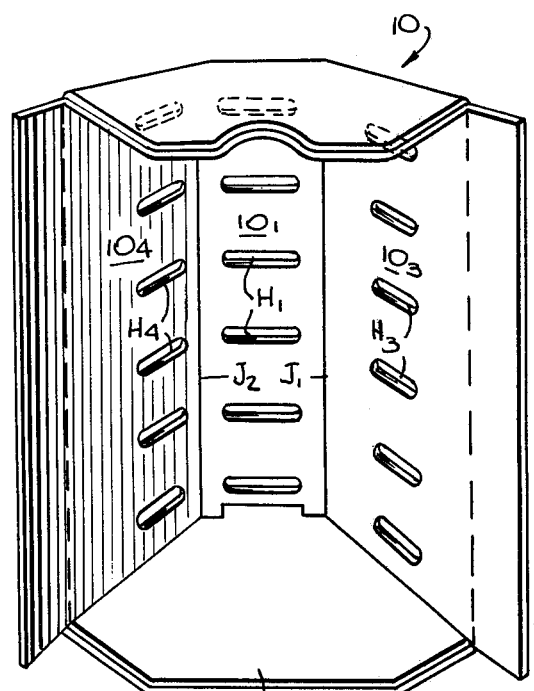
FIG. 2 is a perspective view of one of these trays.

Each tray T, as shown in FIG. 2, has a hexagonal configuration whose sides are constituted by a short rear wall $W_1$, a longer front wall $W_2$, a pair of long side walls $W_3$ and $W_4$ adjoining the rear wall, and a pair of short side walls $W_5$ and $W_6$ adjoining front wall $W_2$. Running along the upper edges of these walls and the corners formed thereby is a continuous, outwardly-extending flange which surrounds the open mouth of the tray. The lid L covering the tray is provided with a downwardly-extending flange, the lid serving to seal the pre-cooked meal against the loss of moisture and other volatile constituents.

Projecting below the bottom of the tray are ridges R or other spacer means, whereby when the trays are vertically stacked within the carton, air circulation spaces are created between the stacked trays. Because of the tray flanges, there are air circulation spaces between the trays and the corresponding walls of the carton. A more detailed disclosure of the tray and lid is found in my copending application Ser. No. 785,527, filed Apr. 7, 1977, entitled "Tray and Lid Assembly."

Figure 3:
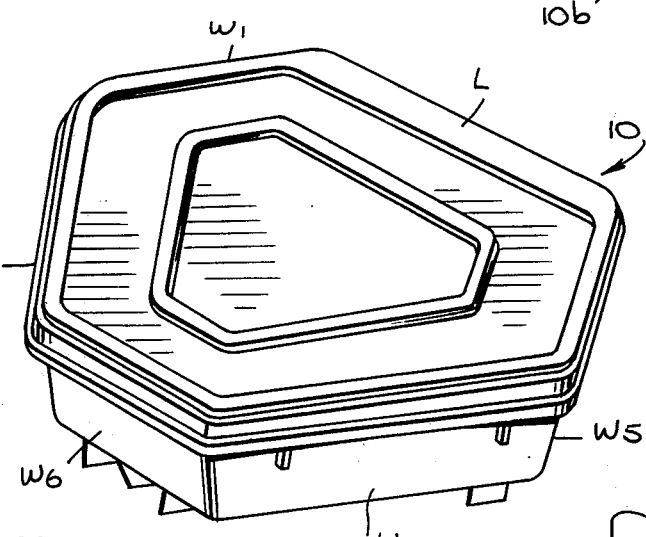
FIG. 3 is a front perspective view of the carton.

Carton 10, as shown in FIG. 3, has a trough-like configuration defined by a short rear wall $10_1$ and a pair of angled long side walls $10_3$ and $10_4$, these walls corresponding to sides $W_1$, $W_3$ and $W_4$ of the stack of trays nested within the carton. The carton is also provided with a top end wall $10_t$ and a bottom end wall $10_b$ whose geometry matches that of the trays, the top end wall having a notch $10_n$ therein to facilitate removal of the trays from the carton.

Rear wall $10_1$ is provided with a vertical row of elongated openings $H_1$ which are centered on this wall. The first side wall $10_3$ is provided with a corresponding row of openings $H_3$ which are off-center thereon, openings $H_3$ being closer to the perforated fold line $F_3$ than to the junction fold $J_1$ between rear wall $10_1$ and side wall $10_3$. The second side wall $10_4$ is provided with a corresponding row of openings $H_4$ which are off-center thereon, these openings being adjacent the junction fold $J_2$ between rear wall $10_1$ and side wall $10_4$.

Extending from side wall $10_3$ is a short flap $10_5$ which is foldable along perforated fold line $F_3$. Similarly provided on side wall $10_4$ is a short flap $10_6$ which is foldable on perforated fold line $F_4$. As shown in FIG. 1, these flaps are folded against the short side walls $W_5$ and $W_6$ of the stack of trays and are bridged by a rupturable sealing band B which may be printed to identify the contents of the trays. Thus when the cartridge is sealed by the band, the trays are locked within the carton, making it possible to handle the cartridges without difficulty. The seal is broken only after the food in the oven has reached its service temperature, at which point the trays may be withdrawn from the carton.

Structure of Cryogenic Machine

Referring now to FIGS. 4 and 5, there is shown a preferred embodiment of a cryogenic machine in accordance with the invention. The machine comprises an elongated, thermally-insulated tunnel structure 11 with an open inlet 12 and an open outlet 13. The tunnel has a rectangular cross-section whose dimensions are sufficient to accommodate two parallel trains $CT_1$ and $CT_2$ of food-loaded cartridges C. Tunnel 11 is supported in a horizontal plane above ground on suitable posts or standards 14.

The cartridges C containing the hot-cooked meals to be rapidly cooled are continuously conveyed from the inlet to the outlet of the tunnel by means of an endless conveyor belt 15 which is looped between two main rollers 16 and 17. The belt extends at either end beyond the inlet and outlet of the tunnel to form a feed-in table 18 and a discharge table 19. Belt 15 is driven by a motor 20 operatively coupled to roller 17. In practice, the upper reach of the belt which runs along the floor of the tunnel may be supported thereon by rollers to reduce friction. The belt itself may be of steel mesh or any other construction suitable for use in conjunction with cryogenic agents.

As best seen in FIG. 4, the two trains $CT_1$ and $CT_2$ of cartridges are formed by parallel rows of cartridges in abutting relationship so that the carton walls thereof which have holes therein face each other and border the space between the trains. This space defines a center aisle $A_c$ running longitudinally through the tunnel. The spaces between the opposite sides of the tunnel 11 and the open carton sides of cartridges C in the trains define outer aisles $Ao_1$ and $Ao_2$.

Disposed within these aisles and supported from the roof of the tunnel by suitable brackets is a series of spaced partition assemblies $P_1$ to $P_9$. The lower end of these assemblies is slightly above the conveyor belt running through the tunnel so that the partitions do not interfere with belt movement. These assemblies effectively divide the tunnel into consecutive stages having the following identifications, going from the inlet to the outlet:

Inlet stage—IS
First Pre-cooling Stage—$PS_1$
Second Pre-cooling stage—$PS_2$
Third Pre-cooling stage—$PS_3$
Fourth Pre-cooling stage—$PS_4$
Main cooling Stage—MS
Stabilization Stage—SS
Outlet Stage—OS Each partition assembly, as shown in FIG. 8, is constituted by a center aisle cross plate 20 whose ends are joined to guide plates 21 and 22, and a pair of outer aisle cross plates 23 and 24 whose respective inner ends are joined to guide plates 25 and 26. Thus cartridge train $CT_1$ runs between guide plates 21 and 25, while cartridge train $CT_2$ runs between guide plates 22 and 26.

Installed on the center aisle cross plate of partition assembly $P_4$ is a fan 27 (this fan being also shown in FIG. 8) and similarly mounted on the center aisle cross plate of partition assembly $P_6$ is a fan 28.

The outer aisle cross plates in partition assembly $P_3$ are provided with ports 29 and 30 to permit the passage of gas between the pre-cooling stages $PS_1$ and $PS_2$, and the outer aisle cross plates in partition assembly $P_5$ are similarly provided with ports 31 and 32 to permit gas passage between precooking stages $PS_3$ and $PS_4$. Mounted midway within inlet stage IS on a center aisle cross plate 33 whose ends have guide plates attached thereto is a fan 34, and likewise mounted within outlet stage OS on a center aisle cross plate 35 whose ends have guide plates attached thereto is a fan 36.

Mounted above the first pre-cooling stage $PS_1$ and communicating therewith is an exhaust flue 37, within which is placed a fan 38. Disposed within the outer aisles $Ao_1$ and $Ao_2$ of the main cooling stage MS are two nozzle sets 39 and 40 each mounted above an inlet manifold as shown in FIG. 9.

Function of Cryogenic Machine

Fed into the main cooling stage MS by nozzle sets 39 and 40 is an atomized cryogenic liquid, such as nitrogen. The liquid is sprayed forward the cartridges passing through this stage, the open sides of the cartons facing the nozzles. Inasmuch as the trays nested within the cartons of the cartridges contain pre-cooled meals which are relatively warm as compared to the liquid cryogenic agent, even though the cartridges, by the time of their arrival at the main cooling stage, have gone through four pre-cooling stages $PS_1$ to $PS_4$, the cryogenic liquid is volatilized and the resultant cold gas is forced into the center aisle of main cooling stage MS through the carton holes. It must be borne in mind that the volume of the volatilized gas is hundreds of times greater than the liquid from which it evolves; hence the gas produced in the main cooling chamber produces a substantial pressure therein causing the gas to seek an escape passage.

The cold gas in the center aisle Ac of the main cooling stage MS is sucked by fan 28 on the cross plate of partition assembly $P_6$ which lies at the junction of this stage and the fourth pre-cooling stage into the center aisle of the latter stage where the cold gas penetrates the cartridges passing through this pre-cooling stage to enter the outer aisles thereof.

From the outer aisles $Ao_1$ and $Ao_2$ of the fourth pre-cooling stage $PS_4$, the cold gas, as indicated by the flow direction arrows, passes through ports 31 and 32 in the outer aisle cross plates of partition assembly $P_5$ lying at the junction of the fourth and third pre-cooling stages, into the outer aisles of the third pre-cooling stage $PS_3$. Here the cold gas is forced through the cartridges passing through this stage into the center aisle thereof, and from this center aisle the cold gas is drawn by fan 27 in the center cross plate of the partition assembly $P_4$ lying at the junction of the third and second pre-cooling stages into the center aisle of the second pre-cooling stage $PS_2$.

The cold gas in the center aisle of the second precooling stage $PS_2$ is forced through the cartridges passing through this stage into the outer aisles thereof, the gas then entering the outer aisles of the first pre-cooling stage $PS_1$ through outer aisle partition ports 29 and 30. In the first pre-cooling stage $PS_1$, the gas is forced from the outer aisles through the cartridges passing through this stage into the center aisle thereof, the gas in this stage being exhausted therefrom by flue fan 38.

A portion of the discharged gas from flue 37 is directed into inlet and outlet stages IS and OS where the fans 34 and 36 therein serve to recirculate the cold gas through the cartridges conveyed through these stages. Since the cartridges in the inlet and outlet stages are exposed to ambient air at their points of entry and exit, the recirculating cold gas within these stages functions as air curtains to effectively isolate the interior of the tunnel from ambient air.

Stabilization stage SS which is interposed between the outlet stage OS and the main cooling stage MS functions to provide a dwell period in the course of which the temperature of the food contained in the sealed trays attains a relatively uniform level throughout the body of the food. It must be borne in mind that the food is cooled from the outside to the inside thereof and that its internal region tends to remain warmer for a longer period than the surface region.

Second Embodiment

In the first embodiment of a machine in accordance with the invention, the two parallel trains of cartridges $CT_1$ and $CT_2$ are carried through the tunnel on a common belt, and in order to permit unimpeded belt travel, the lower ends of partition assemblies $P_1$ to $P_2$ are raised slightly above the belt to clear the belt.

In the embodiment shown in FIGS. 10 and 11, the tunnel structure is essentially the same as in the first embodiment, but instead of a common conveyor belt supported between rollers 16 and 17, use is made of a parallel pair of belts 19A and 19B, each carrying a respective train of cartridges. The outer edges of belts 19A and 19B are spaced from the opposing walls of the tunnel to form the outer aisles $A_{O1}$ and $A_{O2}$, while the inner edges of the belt are spaced from each other to define the center aisle $A_c$. But in this instance, the partition assemblies, such as assembly $P_9$ shown in FIG. 10, can be attached both to the roof and floor of the tunnel, for they do not overlie the pair of belts. The operation of the machine is in all other respects the same as in the first embodiment.

Machine Controls

In order to automatically control input flow of cryogenic liquid into the tunnel at the main cooling stage, a control valve V may be provided in the liquid feed line, as shown in FIG. 9, the valve forming the final control element of a process control loop having a temperature sensor to detect the temperature of the exhaust gas in the flue. The process control system, which includes a pneumatic or electronic controller PC, is provided with an adjustable set point to maintain desired tunnel condition so that no more cryogenic liquid is used than is necessary to reduce the temperature of the food passing therethrough to the desired level.

To control the process the speed of variable speed motor 20, as shown in FIG. 10, is adjusted by a motor control system 20A to regulate the speed of the conveyor in accordance with production requirements. Partition fans 24, 27, 28 and 36 in different stages of the tunnel have different capacities (CFM) according to the temperature gradient of the gas between stages. These fans do not require speed controls in that they function as circulators to expedite the flow of gas to discharge flue 37.

The flue fan 38 is the main fan; for this fan serves to govern the static pressure within the tunnel in conjunction with flue damper 38A. In practice, the static pressure within the tunnel should be close to zero to avoid sucking outside air into the tunnel. In order to maintain this condition of static pressure, an electronic controller EC, as shown in FIG. 12, is responsive to the prevailing state of static pressure in the tunnel. This controller acts through a fan control device 40 to govern fan motor 38 and a damper control device 41 to govern the flue damper 38A whereby the volume and flow rate of the exhaust is regulated to maintain a substantially zero static pressure within the tunnel.

Thus in a machine in accordance with the invention, the cryogenic liquid is introduced into the machine at the main cooling stage and the evolved cold gas is directed in a circuitous and turbulent path through a succession of pre-cooling stages in countercurrent relationship to the trains of cartridges being transported through these stages, the path intersecting and penetrating the cartridges in each stage in heat exchange relationship with the sealed trays containing the cooked meals. In this way, the temperature of the food is rapidly but not abruptly reduced; for the cryogenic gas, by the time it reaches the first pre-cooling stage, is relatively warm, and as the food advances from this stage toward the main cooling stage, it is subjected to a progressively colder gas.

While there has been shown and described a preferred embodiment of a cryogenic rapid food cooling machine in accordance with the invention, it will be appreciated that many changes and modifications may be made therein without, however, departing from the essential spirit thereof.

I claim:

1. A cryogenic machine for rapidly cooling cartridges, each formed by a vertical stack of trays which are spaced from each other and nested within an open carton whose walls have holes therein, the trays having cooked meals sealed therein, said machine comprising:
    A. a tunnel having an inlet and an outlet;
    B. a conveyor to continuously transport two parallel trains of said cartridges from the inlet to the outlet of said tunnel, the space between said trains being bordered by the carton walls and defining a center aisle in said tunnel and the spaces between the opposing sides of the tunnel and the open sides of the cartons defining outer aisles;
    C. partition assemblies mounted in said aisles to divide the tunnel into inlet and outlet stages, a main cooling stage adjacent the outlet stage and a succession of pre-cooling stages between the main cooling stage and the inlet stage;
    D. means in said main cooling stage to feed a liquid cryogenic agent therein which is volatilized by the food passing therethrough to produce a cold gas; and
    E. fan means to draw the cold gas from said main cooling stage and to direct it in a circuitous path through said succession of pre-cooling stages, said path in each pre-cooling stage running through the spaces between the trays in said cartridges between the center aisle and the outer aisles.

2. A machine as set forth in claim 1, wherein said tunnel has a rectangular cross-section and is thermally-insulated.

3. A machine as set forth in claim 1, wherein said liquid is nitrogen.

4. A machine as set forth in claim 1, wherein said conveyor is an endless belt whose upper reach passes through said tunnel and whose lower reach passes under said tunnel.

5. A machine as set forth in claim 1, wherein said fans means includes a fan in the center aisle at the junction of the main cooling stage and the directly adjacent pre-cooling stage.

6. A machine as set forth in claim 1, wherein said succession includes at least three pre-cooling stages.

7. A machine as set forth in claim 1, wherein each partition assembly includes a cross plate in the center aisle and a cross plate in each outer aisle.

8. A machine as set forth in claim 7, wherein said cross plates have guide plates attached thereto to define guide passages to accommodate said trains.

9. A machine as set forth in claim 1, wherein the pre-cooling stage adjacent the inlet stage is provided with a discharge flue to exhaust the cold gas therefrom.

10. A machine as set forth in claim 9, further including means to direct a portion of said exhaust gas into said inlet and outlet stages and to recirculate the gas in said stages to form air curtains therein to isolate the tunnel from ambient air.

11. A machine as set forth in claim 1, further including means to automatically regulate the flow of liquid into said main cooling stage to reduce the temperature of meals passing through the machine to a predetermine level.

* * * * *